UNITED STATES PATENT OFFICE.

BURTON E. NOBLE, OF SPRINGFIELD, MASSACHUSETTS.

COMPOSITION OF MATTER FOR PLASTERING.

No. 835,831.　　　　Specification of Letters Patent.　　　　Patented Nov. 13, 1906.

Application filed August 31, 1906. Serial No. 332,771.

*To all whom it may concern:*

Be it known that I, BURTON E. NOBLE, of Springfield, in the county of Hampden and State of Massachusetts, have invented certain new and useful Improvements in a Composition of Matter for Plastering, of which the following is a specification.

This invention relates to an improved composition of matter for plastering walls, ceilings, and similar uses and the process of making the same.

The object of the invention is to improve upon the plastering at present in use in several respects, among which are to decrease the conductivity of sound and of heat, to eliminate the tendency to crack or to chip under a blow, to improve the fireproof qualities, and to reduce the cost both in the item of component materials and in the item of labor expense for preparing and applying the composition to a wall.

Hitherto inventors seeking to improve the art to which this relates have thought it necessary to employ plaster-of-paris as one component, which has the disadvantage that it sets quickly and cracks in hardening and requires a restrainer to make it workable, and frequently in order to prepare a mixture which can be stored ready for use they employ slaked lime as an ingredient, subsequently applying water to make the mass plastic; but products formed by this method have the objection of lacking strength.

It is another object of the present invention to produce a plaster which dries more slowly and when dry is stronger and is internally bound together more firmly than is true of either of these types.

In carrying out the invention I employ as the main basis of the composition ground or pulverized asbestos, which may be obtained as the waste product of asbestos-mines, and I mix with this a small quantity of sand, preferably beach-sand, although other finely-comminuted rock will serve, and a small quantity of fibrous material, preferably asbestos fiber. I also prepare separately a small quantity of unslaked lime. Thus prepared, the ingredients may be stored ready for convenient use when needed and do not suffer by lapse of time. When ready to use, the lime is slaked with water, the mixture first described is immediately added, and the whole is thoroughly intermixed and brought to a proper consistency. The mass can be retained in this condition a convenient time to allow for transportation in sizable quantity from a central mixing plant to the place where needed for use and can be applied comfortably to the work with trowel and darby. As thus constituted by far the largest constituent of the composition is the pulverized asbestos waste. Considering its superior specific gravity, the sand occupies a very minor part of the volume. The sand may be omitted, a suitable additional amount of pulverized asbestos being substituted; but the best effect is obtained as indicated. Without the sand the product will have firm and elastic qualities, but will not flow with readiness into the interstices of laths or whatever other surface is to receive the composition. I have discovered that the addition of a little sand renders the composition more fluid in that respect, eliminates a certain suction that is otherwise noticed in working it, and improves the darbying process, making the darby run clearer and enabling the composition to be spread with security over a greater surface. The proportions which I have found best are as follows, by weight: pulverized asbestos, thirty-four parts; asbestos fiber, one part; sand, six parts; lime, five parts.

The foregoing proportions may be varied to some extent; but in general they express the combination and proportion of ingredients which I have found effective for accomplishing the said objects. The two kinds of asbestos and the sand may be mixed by machinery. Some other kind of fiber may be substituted for the asbestos fiber; but the structural similarity of the two ingredients when both kinds of asbestos are employed results in a peculiarly intimate relationship in the internal structure of the finished product. The result is a product which when dry is firmly united, is elastic when subjected to blows, is incombustible, and a non-conductor both of heat and of sound, adhering strongly to the wall on which it is set, and not subject to cracks nor liable to chip off when nails are driven into it.

Although herein described as it may be applied to walls or ceilings, the plaster may with equal facility be formed into slabs or blocks by the use of molds or otherwise.

I claim—

1. A plastering composition formed by mixing asbestos powder and a fibrous material with fresh wet slaked lime, substantially as described.

2. A plastering composition formed by mixing asbestos powder, a fibrous material, and a small proportion of sand with fresh wet slaked lime, substantially as described.

3. The process of forming a plastering compound consisting in preparing separately a mixture of asbestos powder, sand and fiber; and a quantity of unslaked lime; and then slaking the lime with water and adding the mixture thereto while wet, substantially as described.

In testimony whereof I have affixed my signature in presence of two witnesses.

BURTON E. NOBLE.

Witnesses:
CHAS. L. YOUNG,
LOTTIE A. DOWNING.